(12) United States Patent
Rosasco

(10) Patent No.: US 9,911,205 B1
(45) Date of Patent: Mar. 6, 2018

(54) VISUAL CONTINUITY FOR ARBITRARY LENGTH STIPPLE PATTERNS

(71) Applicant: GOOGLE LLC, Mountain View, CA (US)

(72) Inventor: John Donald Rosasco, Santa Cruz, CA (US)

(73) Assignee: GOOGLE LLC, Mountain View, CA (US)

( * ) Notice: Subject to any disclaimer, the term of this patent is extended or adjusted under 35 U.S.C. 154(b) by 329 days.

(21) Appl. No.: 14/643,909

(22) Filed: Mar. 10, 2015

Related U.S. Application Data

(60) Provisional application No. 61/953,339, filed on Mar. 14, 2014.

(51) Int. Cl.
*G06T 11/00* (2006.01)

(52) U.S. Cl.
CPC .................................. *G06T 11/001* (2013.01)

(58) Field of Classification Search
None
See application file for complete search history.

(56) References Cited

U.S. PATENT DOCUMENTS

| 6,439,465 | B1 | 8/2002 | Bloomberg |
| 7,221,368 | B1 | 5/2007 | Crow et al. |
| 2004/0100474 | A1* | 5/2004 | Demers ................. G06T 11/203 345/582 |
| 2004/0263525 | A1* | 12/2004 | Poddar .................. G06T 11/001 345/582 |
| 2006/0110026 | A1* | 5/2006 | Strassenburg-Kleciak .................. G01C 15/00 382/154 |
| 2007/0013712 | A1* | 1/2007 | Cohen ................... G06T 11/001 345/582 |
| 2007/0146366 | A1 | 6/2007 | Seetharamaiah et al. |

* cited by examiner

*Primary Examiner* — Aaron M Richer
(74) *Attorney, Agent, or Firm* — Marshall, Gerstein & Borun LLP

(57) ABSTRACT

An indication of a polyline having multiple vertices and a stipple pattern of a not-a-power-of-two length are received. The stipple pattern is to be repeatedly rendered along the polyline. To reduce visual discontinuity, a texture of a power-of-two length, to be repeatedly applied along the polyline, is generated. The texture is made up of several whole instances of the stipple pattern and a portion of another instance of the stipple pattern defining remainder texels. The texture is modified so that visual pattern discontinuity substantially aligns with a vertex of the polyline at which a maximum amount of change in direction of the polyline occurs.

20 Claims, 6 Drawing Sheets

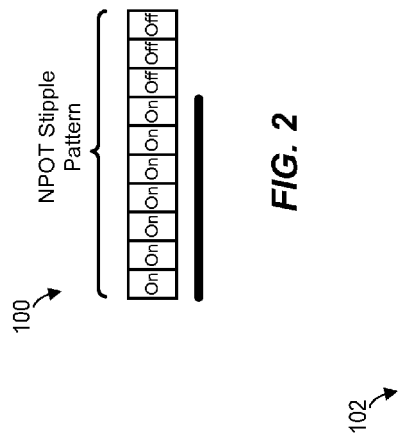
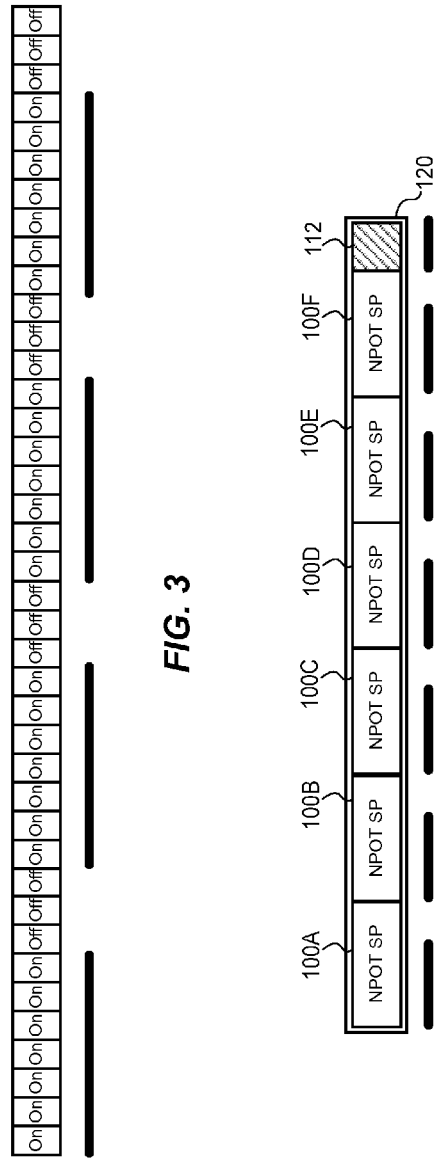

V2: LDD2, V1: LDD1, V3:LDD3

V2: OFST2, V1: OFST1, V3:OFST3

VISUAL CONTINUITY FOR ARBITRARY LENGTH STIPPLE PATTERNS

FIELD OF THE DISCLOSURE

The present disclosure relates to graphics processing and, more particularly, to rendering patterns repeating along rendered strokes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Two-dimensional (2D) stroke rendering can be achieved in modern graphics processing units (GPUs) by generating extrusion polygons along a centerline. For continuity and scaling without aliasing, texturing can be used to blend (anti-alias), apply patterns along the length of the stroke, or stencil the stroked lines. In general, texturing hardware in the GPUs limits the width and height of textures. A stroke that is longer in window-space coordinates than the maximum allowable texture width of the GPU requires that the pattern encoded in the texture repeats. This repetition is trivial when the length of the pattern is power-of-two (POT), as measured in texture pixels ("texels"). This is so because modern GPUs allow a so-called repeat mode such that if the normalized texture coordinate space is exceeded, the GPU will perform a modulo (1.0) operation (remainder is always the mantissa of the original texture coordinate value) on the texture coordinates, resulting in a repeating effect on the texture coordinate space. This effect allows repetition of a pattern along the length of the stroke. However, when the length of the pattern is a not-power-of-two (NPOT), many GPUs do not support texture repetition.

SUMMARY

The techniques of this disclosure allow GPU to repeatedly render a stipple pattern of an NPOT length along a polyline of arbitrary length in an efficient and aesthetically pleasing manner. In particular, a software module generates a texture of POT length using one or more whole instances of the stipple pattern and a fragment of another instance of the stipple pattern defining the remainder texels. The software module then modifies the texture so as to align, as closely as practicable, the areas of visual discontinuity with vertices of the polyline at which the changes in direction of the polyline are most prominent.

More particularly, one embodiment of these techniques is a method for reducing visual discontinuity when rendering stipple patterns, which can be executed by one or more processors. The method includes receiving (i) an indication of a polyline having multiple vertices, and (ii) a stipple pattern of an NPOT length, to be repeatedly rendered along the polyline. The method further includes generating a texture of a POT length, to be repeatedly applied along the polyline, such that the texture is made up of several whole instances of the stipple pattern and a portion of another instance of the stipple pattern defining remainder texels. Still further, the method includes modifying the texture so that visual pattern discontinuity aligns with a vertex of the polyline at which a maximum amount of change in direction of the polyline occurs.

Another embodiment of these techniques is a computing device includes a communication interface, graphics processing hardware configured to support textures only of certain lengths for repeated application to geometry, and processing hardware coupled to the communication interface and the graphics processing hardware. The processing hardware is configured to receive, via the communication interface (i) an indication of a polyline having multiple vertices, and (ii) a stipple pattern of a first length to be repeatedly applied along the polyline. The processing hardware is further configured to generate a texture of a second length supported by the graphics processor made up of several whole instances of the stipple pattern and a portion of another instance of the stipple pattern defining remainder texels. The processing hardware is further configured to modify the texture so that visual pattern discontinuity aligns with a vertex of the polyline at which a maximum amount of change in direction of the polyline occurs, when the graphics processor configured repeatedly applies the texture to the polyline.

Still another embodiment of the techniques of this application is a method for reducing visual discontinuity when rendering stipple patterns, which can be executed by one or more processors. The method includes receiving (i) an indication of a polyline having multiple of vertices, and (ii) a stipple pattern of a first length to be repeatedly rendered along the polyline. The method further includes generating a texture for applying to the polyline using graphics processing hardware, such that the texture is made up of several whole instances of the stipple pattern and a portion of another instance of the stipple pattern defining remainder texels, and such that the texture has a second length that is not evenly divisible by the first length. The method further includes identifying one of the vertices at which a maximum amount of change in direction of the polyline occurs, and modifying the texture so that visual pattern discontinuity aligns with the identified vertex.

BRIEF DESCRIPTION OF THE DRAWINGS

FIG. 2 illustrates an example stipple pattern of an NPOT length;

FIG. 3 illustrates multiple instances of the stipple pattern of FIG. 2, repeated to generate a dashed line;

FIG. 4 illustrates a texture of a POT length including several instances of the stipple pattern of FIG. 2 and several remainder texels;

DETAILED DESCRIPTION

Overview

Figure 1:
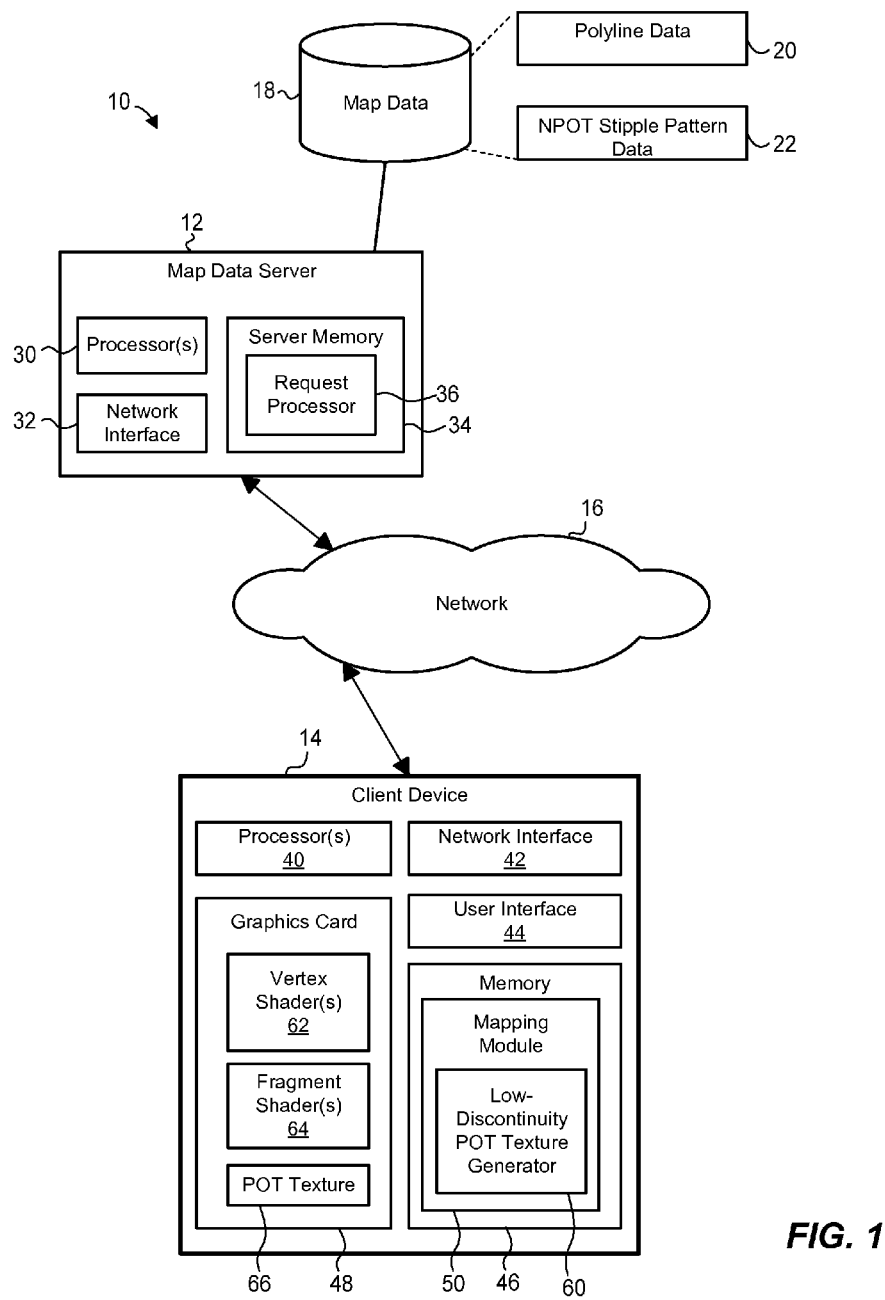
FIG. 1 is a block diagram of an example computing system in which pattern rendering techniques of this disclosure can be implemented.

A system such as the one described below renders strokes of arbitrary length with repeated stipple patterns that are not necessarily of the length that a GPU supports in the repeat mode, in an aesthetically pleasing manner. Generally speaking, the system can improve visual continuity by efficiently aligning, to the extent possible, visual discontinuities in a polyline with visual discontinuities in a texture applied to the polyline. In this manner, the system need not rely on a very large POT texture the sampling of which results in few repetitions in screen space.

To render a stipple pattern, the system can use dedicated alpha-only texture to modulate transparency of a stroke. Stipple patterns may be encoded as individual scan lines (rows) of the alpha texture. The system can implement a window-space algorithm generally requiring the length of each dash in the drawn pattern to be consistently sized in window-space pixels (in contrast to some three-dimensional world space coordinate systems where objects are drawn in accordance with the projection of the camera).

To use the repeat mode of the GPU, the system generates a texture having a POT length from several instances of the stipple pattern of an NPOT length. Because a POT number is not divisible by an NPOT number, the texture includes one or more remainder texels corresponding to an incomplete instance of the stipple pattern. These remainder texels form an area of visual discontinuity if the texture is used without modification. Because visual discontinuity in a polyline is most noticeable at vertices where the polyline changes direction, the system modifies the texture is such a way that one or more areas of most significant visual discontinuity in the repeating pattern coincide, as much as practicable, with areas of most significant visual discontinuity in the polyline (i.e., the vertices at which the polyline changes direction the most).

To this end, the system analyzes the polyline to determine "line direction deltas," or metrics indicative of the change in direction of the polyline, for all the vertices of the polyline. The system organizes these line direction deltas into a sorted list. Then, the system determines an offset value for each of the line direction deltas within the texture and generates the corresponding sorted list (sorted by the line direction deltas).

Starting with the offset value at the head of the list, the system begins to modify the texture in view of several factors by removing or inserting texels at (or near) the currently selected offset value. For example, the system can increase the length of a dash or increase the space between dashes. In other words, the system substantially aligns the most significant visual discontinuity in the pattern with a vertex at which a maximum amount of change in the direction of the polyline occurs. The system can modify the texture further in view of other factors or constraints. Thus, the system can attempt to preserve the ratio of dashes to spaces, for example. The system can perform the adjustments iteratively until the remainder texels are eliminated.

The system need not modify the contents of the buffer in which the texture is stored and can instead modulate texture coordinates without directly modifying the texture itself (because the pattern which the texture represents may be used for multiple lines). For ease of explanation, however, any suitable manner in which the system can apply a texture using the techniques of this disclosure is referred to this document as "texture modification." Thus, texture modification as referenced herein can include direct modification of texture by re-arranging texels in a buffer, copying a texture to another buffer with modifications, modifying texture coordinates, etc.

These and related techniques are discussed in more detail below with example reference to digital maps. It is noted, however, that these techniques can be used in any suitable environment where strokes are drawn with repeated patterns.

Example Computing System in which Stipple Patterns can be Repeatedly Applied to Geometries FIG. 1 is a block diagram of an example computing system 10 in which a map data server 12 provides map data to a client device 14 via a communication network 16 for rendering an interactive digital map. Map data, which can be stored in a map database 18, can include polyline data 20 that describes, for example, roads, bicycle paths, pedestrian paths, railway paths, shipping routes, airlines routes, etc. Besides various types of paths, the polyline data 20 can describe boundaries of countries, cities, neighborhoods, etc., when these boundaries are illustrated on a digital map using stroke-based rendering. More generally, the polyline data 20 can include sequences of interconnected line segments for rendering any suitable map features.

Map data stored in the map database 18 also can include descriptions of geometry for various other map features such as buildings, parks, and bodies of water, text labels, textures, various forms of metadata, etc. Some of these map features can be defined in a vector graphics format or another suitable scaleable format. In some cases, map data also can include raster images in a bitmap format, for example.

The map data server 12 can organize and serve map data to client devices using any suitable scheme, such as map tiling, for example. Map tiles generally correspond to a two-dimensional organization of geospatial data into a quadtree. Each tile at a given zoom level is divided into four tiles at the next level up to the highest level of magnification. Similarly, three-dimensional organization of geospatial data can be implemented using octrees. To map the surface of the Earth onto a plane, Mercator or another suitable projection can be used.

The map database 18 also stores NPOT stipple pattern data 22 for use with various strokes. For example, a certain stipple pattern can describe dashed line, another stipple pattern can describe a dotted line, etc. Some stipple patterns can be relatively short (e.g., 10 texels) while other stipple patterns can be relatively long (e.g., 30 texels). The techniques of this disclosure can provide a particular visual benefit when the stipple pattern is long and/or sophisticated (e.g., 8 or 10 dashes or two or more lengths). In some embodiments, stipple patterns are described as alpha-only texture. In other words, the alpha value in each texel specifies whether a pixel is visible or transparent. In an example scenario, the client device 14 requests map data for a certain geographic area, to be displayed at a certain zoom level. The map data server 12 in response provides map data for rendering a digital map of the area. The map data can include a polyline for a road included in the digital map, and a stipple pattern describing how the road is to be rendered.

With continued reference to FIG. 1, the map data server 12 can be implemented as a single device or as a group of devices. One or more of these devices can include one or more processors 30, a network interface 32, and a non-transitory computer-readable memory 34 that stores instructions executable on the one or more processors 30. For example, a request processor 36 can process requests from client devices such as the client device 14, identify and retrieve relevant polylines and patterns from the map database 18 (along with other relevant map data), and transmit this data to the requesting client device.

Similarly, the map database 18 can be implemented in a single storage device or multiple storage devices. The communication network 16 can include any suitable number of Internet links, local area links, long-range wireless link, short-range wireless links, etc.

In the example of FIG. 1, the client device 14 is a portable device such as a smartphones or tablet computers, for example. In general, however, the techniques for interpolating style parameters and rendering patterns of graphics can be utilized both in portable and non-portable computing devices. The client device 14 includes one or more general-purpose processors 40, a network interface 42 configured to communicate with other devices via the network 16, a user interface 44 (which may include a display device, a keyboard, a touchscreen, etc.), a non-transitory computer-readable memory 46, and a graphics card 48.

The memory 46 stores a mapping module 50 that generates interactive digital maps. Depending on the implementation, the mapping module 50 can operate as a standalone application or as a component of another application such as a web browser, for example. The mapping module 50 can implement a low-discontinuity POT texture generator (for simplicity, "texture generator") 60 that generates a POT texture 66 using an NPOT pattern, in accordance with the techniques of this disclosure. A vertex shader 62 and/or fragment shader 64 can reference the POT texture 66 during operation. For example, the vertex shader 62 can include instructions to generate a polyline made up of a sequence of interconnected vertices and request that the graphics card apply the POT texture 66 along the polyline in a repeat mode. Operation of the texture generator 60 is discussed in more detail below. It is noted that the texture generator 60 in other embodiments can be implemented in the map data server 12 or another network device.

Rendering Repeated Stipple Patterns of NPOT Lengths in an Aesthetically Pleasing Manner Now referring to FIG. 2A, an NPOT stipple pattern 100 can be defined as an alpha-only texture made up of seven consecutive "on" texels followed by three consecutive "off" texels. Thus, the length of the stipple pattern 100 is ten, which of course is not a power of two. When applied as texture to a line segment, the stipple pattern 100 as a dash followed by a space, as also illustrated in FIG. 2A. FIG. 3 illustrates a sequence 102 made up of multiple instances of the stipple pattern 100, repeated one after another to generate a dashed line. The stipple pattern 100 can be stored in the map database 18 as part of the NPOT stipple pattern data 22, and provide to the client device 14 for use with polylines of arbitrary length.

In particular, to use the stipple pattern 100 with a relatively long polyline, the texture generator 60 operating in the client device 14 can generate a texture 120 of a POT length. The graphics card 48 then can easily draw multiple instances the texture 120 along the polyline in a repeat mode.

The texture 120 in this example is 64 texels long. Accordingly, the texture 120 includes six whole instances of the stipple pattern 100, instances 100A-100F. The texture 120 also includes four remainder texels 112, which can be the first four of the stipple pattern 100 (in this example, four "on" values). It is noted that if multiple instances of the texture 120 are trivially repeated, the remainder texels 112 of instance N of the texture 120 will form, along with the stipple pattern 100A of instance N+1 of the texture 120, an area of visual discontinuity. The seven-on, three-off pattern will be interrupted by the sequence of eleven "on" values preceded by three "off" values and followed by "three" values.

Figure 5:
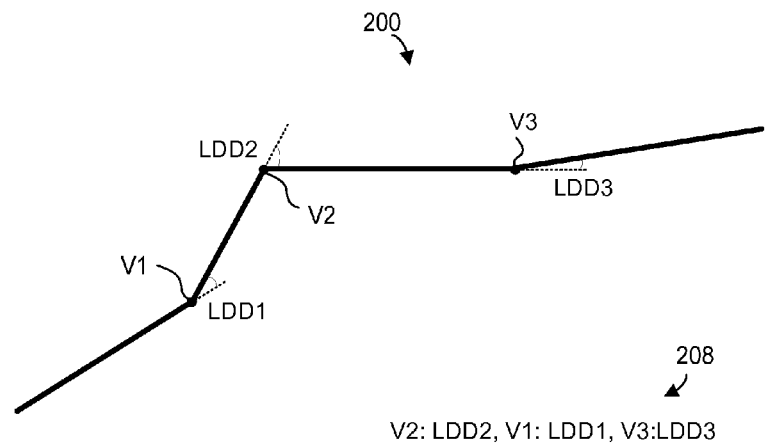
FIG. 5 illustrates an example polyline with different line direction deltas at different vertices, which can be rendered with the texture of FIG. 4.

Now referring to FIG. 5, the stipple pattern 100 can be used with an example polyline 200, which the map data server 12 can provide to the client device 14, similarly to the stipple pattern data 100. Depending on the scenario, the polyline 200 can define the centerline for a road or any other map feature representing a physical entity or a logical entity.

To reduce visual discontinuity, the texture generator 60 first analyzes the polyline 200 to determine a line direction delta (LDD) value at each of the vertices V1, V2, and V3. The LDD in general is a metric indicative of the amount of change in direction of the polyline. Each LDD can be, for example, an angle between the two line segments connected by the corresponding vertex. As illustrated in FIG. 5, the polyline 200 changes its direction the most at the vertex V2, and the least at the vertex V3. The texture generator 60 accordingly can generate an ordered list 208, listing the LDDs and the corresponding vertices in the descending order. The texture generator 60 can store the ordered list 208 in any suitable data structure.

Figure 6:
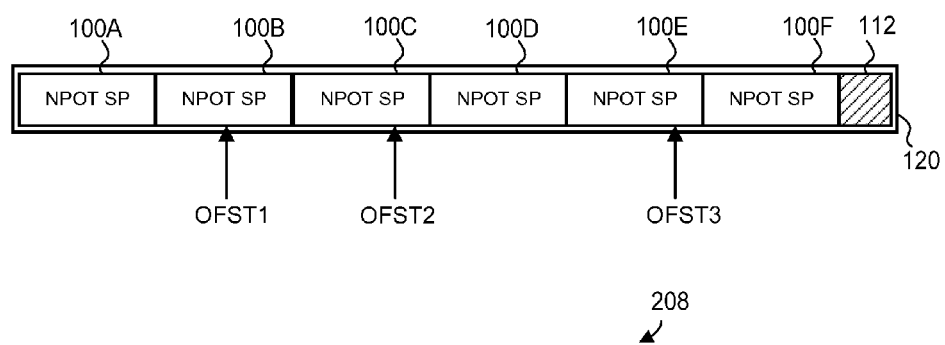
FIG. 6 illustrates offsets in the texture of FIG. 4, generated in view of the line direction deltas illustrated in FIG. 5.

Referring to FIG. 6, the texture generator 60 then calculates the offset within the texture 120 for each element in the list 208. To this end, the texture generator 60 can calculate the distance between the starting point of the polyline and the vertex and divide the calculated distance by the length of the texture 120, so that the offset corresponds to the remainder. The texture generator 60 then can generate an ordered list 210 that lists the calculated offsets in the order of the corresponding LDD values, i.e., in the order of the list 208.

Figure 7:
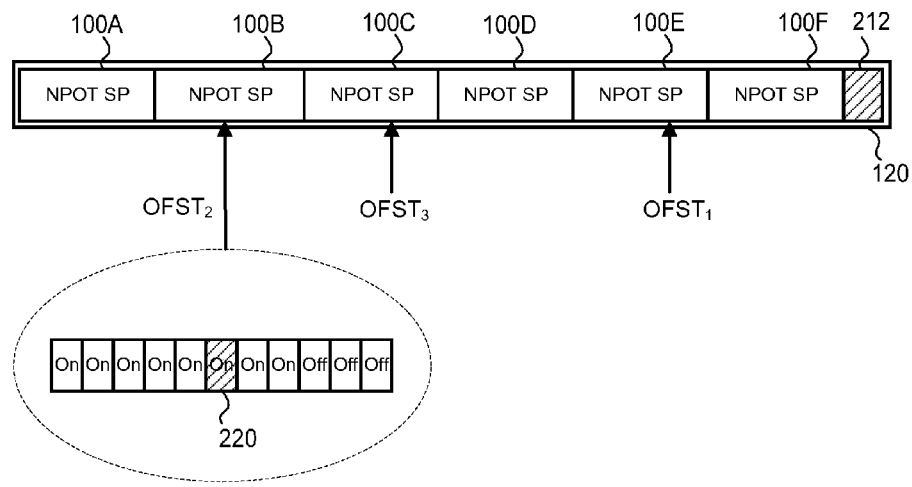
FIG. 7 schematically illustrates modification of the texture of FIG. 4 using the ordering of line direction deltas illustrated in FIG. 5.

Next, FIG. 7 schematically illustrates how the texture generator 60 can modify the texture 120 using the lists 208 and 210. Because the largest change in direction of the polyline 200 occurs at the vertex V2, the texture generator 60 first modifies the instance 100B that includes a texel corresponding to the offset of the vertex V2. By modifying the instance 100B, the texture generator 60 effectively introduces a certain amount of visual pattern discontinuity into this portion of the texture. In this example, the texture generator 60 extends the sequence of "on" texels by another "on" texel 220. In other embodiments or scenarios, however, the texture generator 60 can reduce the sequence of "on" texels by a texel, or modify the sequence of "off" texels. Further, the texture generator 60 shifts the instances 100C-F to the right by one texel to eliminate one of the remainder texels 212. Thus, the texture generator 60 causes vertex V2, corresponding to the largest change in direction of the polyline 200, to align with the area of visual pattern discontinuity in the texture. Because the number of added or removed texels can vary in various scenarios, the alignment can be referred to herein as "substantial alignment."

Figure 8:
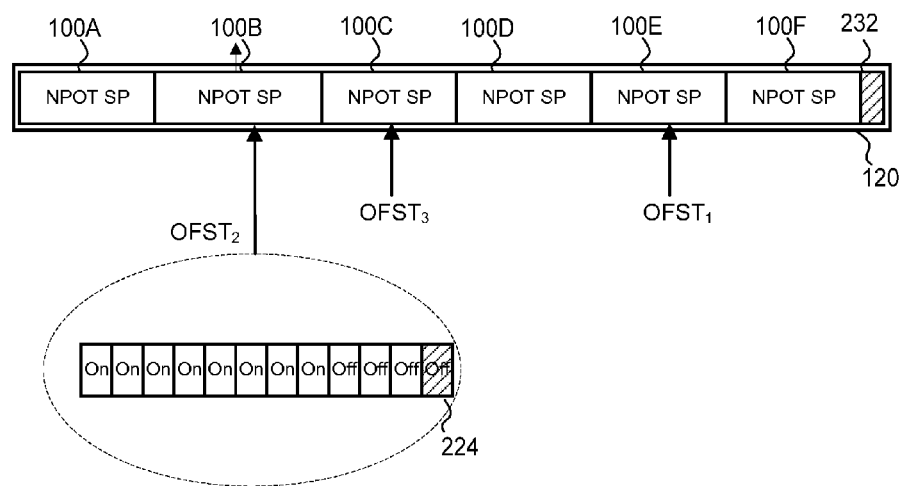
FIG. 8 schematically illustrates modification of the texture of FIG. 7 using the ordering of line direction deltas illustrated in FIG. 5.

Now referring to FIG. 8, the texture generator 60 can continue to further adjust instances of the stipple pattern 100 included in the texture 120 to further reduce the number of remainder texels 212. The texture generator 60 in this case extends the sequence of "off" texels by an "off" texel 224 in the instance 100B. In some embodiments, the texture generator 60 continues to modify one or several instances of the stipple pattern until all the remainder texels 212 are eliminated, so that the texture 120 is made up of a whole number of instances of the stipple pattern 100 (or modified versions thereof).

The texture generator 60 can perform modifications of instances of the stipple pattern in view of certain principles. For example, the texture generator 60 can extend the more frequent value in the pattern prior to extending the less frequent value in the pattern. Thus, the texture generator 60 will add an "on" value to the stipple pattern 100 before adding an "off" value. In general, the texture generator 60 will prioritize instances of the stipple pattern 100 that lie in the areas of largest direction changes in the polyline 200 (as reflected by the list 208) to converge on a version of the texture 120 in which the modified instances of the stipple pattern 100 evenly or nearly evenly divide the texture 120. Further, the texture generator 60 attempts to approximately preserve the original ratio of dashes to spaces in the modifies instances of the stipple pattern 100.

Figure 9:
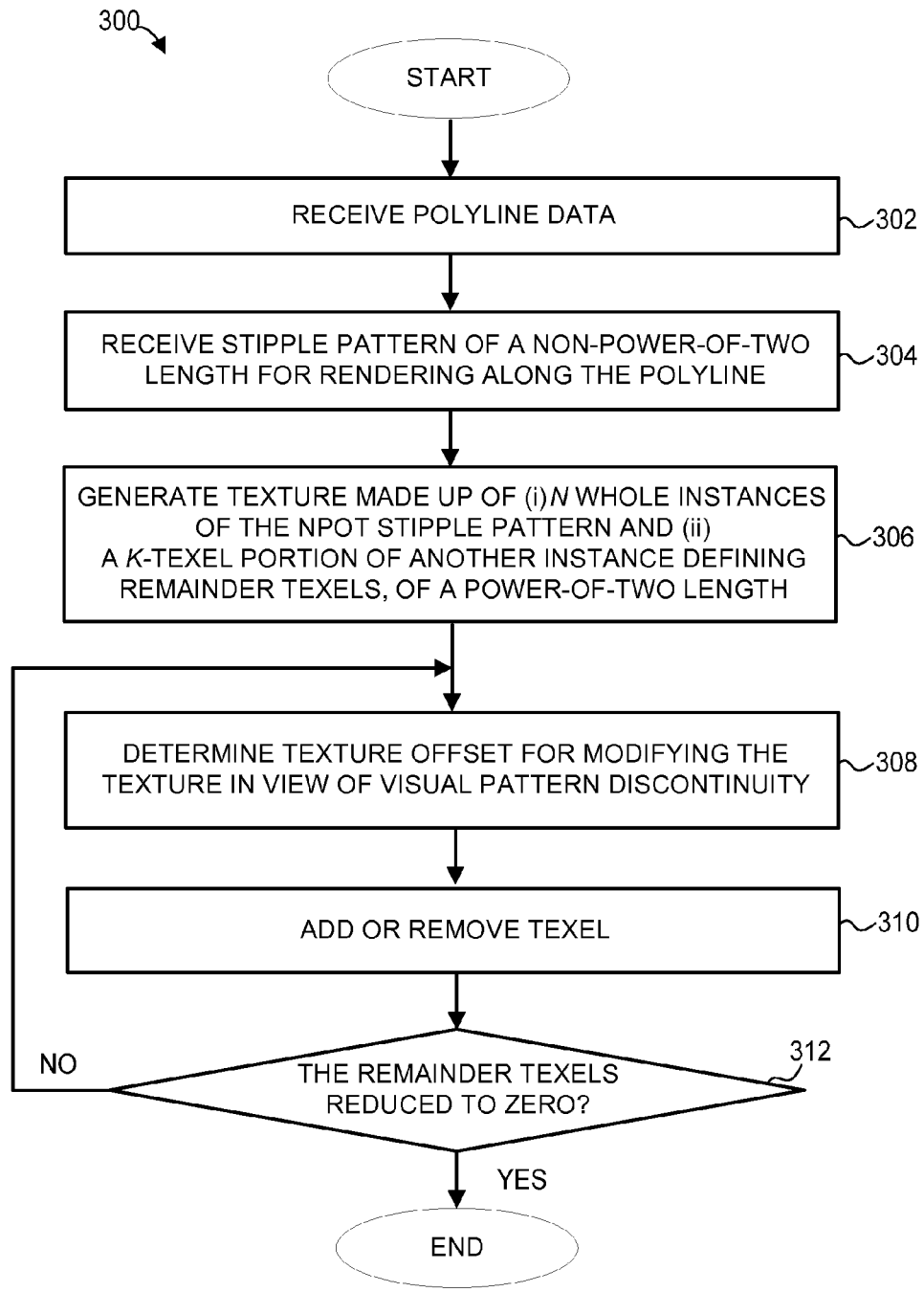
FIG. 9 is a flow diagram of an example method for reducing visual discontinuity when rendering stipple patterns along polylines, which can be implemented in the system of FIG. 1.

For further clarity, FIG. 9 is illustrates an example method 300 for reducing visual discontinuity when rendering stipple patterns along polylines, which can be implemented in the texture generator 60, for example.

The method 300 begins at block 302, when polyline data is received. The polyline can be specified as a sequence of vertices $V_1, V_2, V_3, \ldots V_N$, where vertices $V_i$ and $V_{i+1}$ are connected by an edge. In some cases, the polyline can define an enclosed space (a polygon). The polyline data does not define a manner in which edges between vertices are rendered. Rather, at block 304, a stipple pattern of an NPOT length is received. In other scenarios, stipple patterns of POT lengths also can be received, but such patterns can be handled by a graphics processors trivially.

At block 306, a texture of a POT length is generated. The texture is made up of N instances of the stipple pattern, where N is a positive whole number equal or greater than one, and K remainder texels corresponding to the first K texels of another instance of the stipple pattern, for example.

According to the method 300, blocks 308-312 are executed once or several times until the condition of block 312 is satisfied. In particular, at block 308, a texture offset for modifying the texture is determined in view of visual pattern discontinuity of the texture as well as visual discontinuities of the polyline (which generally correspond to vertices at which the polyline significantly changes its direction). To this end, the method of FIG. 10 can be executed, for example. At block 210, a texel is removed or added to a certain instance of the stipple pattern included in the texture. Next, if it is determined at block 312 that the remainder texels has not yet been reduced to zero, the flow returns to block 308. Otherwise, the method 300 completes.

Figure 10:
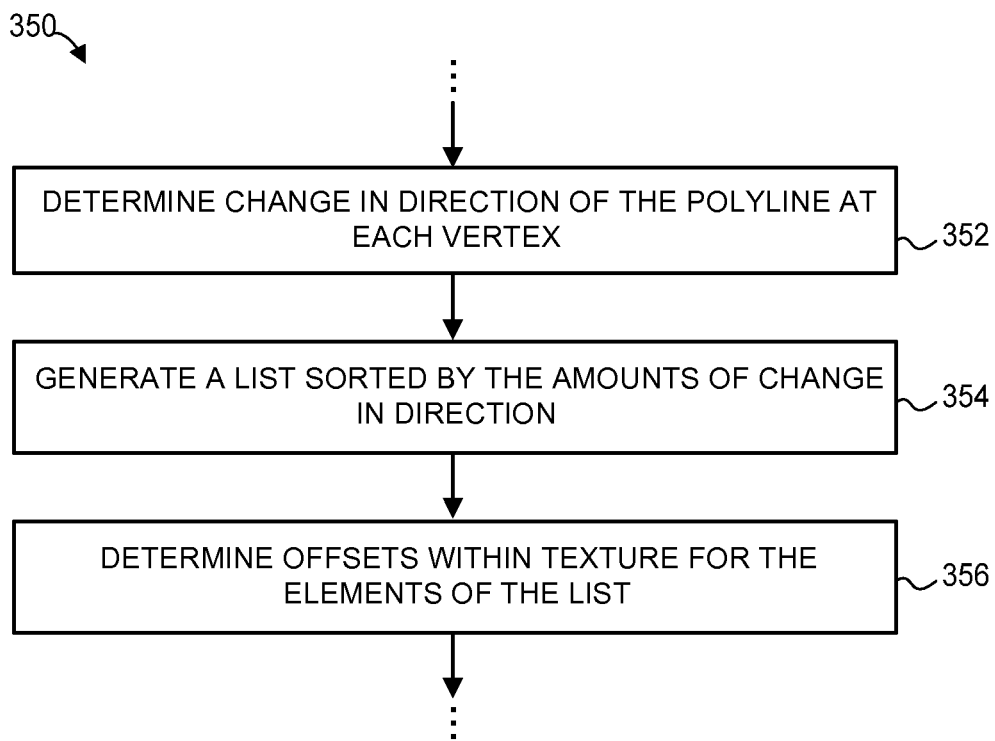
FIG. 10 is a flow diagram of an example method for determining offsets at which a texture can be modified, which can be implemented in the system of FIG. 1.

FIG. 10 is a flow diagram of an example method 400 for determining offsets at which a texture can be modified. Similarly to the method 300, the method 400 can be implemented in the texture generator 60 of FIG. 1. As indicated above, the method 400 can be executed to determine offsets at which a texture made up of instances of a stipple pattern of an NPOT length should be modified. At block 352, a change in direction of the polyline (LDD) at each vertex is determined, and a sorted list of line direction deltas is generated at block 354. At block 356, offsets within the texture are determined for the list generated at block 354. The resulting offsets can be similarly placed in a list sorted by the LDDs corresponding to these offsets. The offsets closer to the head of the list are prioritized over offsets farther away from the head of the list when the texture is modified.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for rendering repeating stipple patterns through the disclosed principles herein. Thus, while particular embodiments and applications have been illustrated and described, it is to be understood that the disclosed embodiments are not limited to the precise construction and components disclosed herein.

What is claimed is:

1. A method for reducing visual discontinuity when rendering stipple patterns, the method comprising:
    receiving, by one or more processors, (i) an indication of a polyline having a plurality of vertices, and (ii) a stipple pattern of a not-a-power-of-two (NPOT) length, to be repeatedly rendered along the polyline;
    generating, by the one or more processors, a texture of a power-of-two (POT) length, to be repeatedly applied along the polyline, wherein the texture is made up of several whole instances of the stipple pattern and a portion of another instance of the stipple pattern defining remainder texels;

identifying, by the one or more processors, a vertex from the plurality of vertices of the polyline at which a maximum amount of change in direction occurs; and modifying, by the one or more processors, the texture so that visual pattern discontinuity aligns with the identified vertex of the polyline at which the maximum amount of change in direction of the polyline occurs.

2. The method of claim 1, further comprising:

determining, by the one or more processors, respective amounts of change in direction at the plurality of vertices;

generating, by the one or more processors, an ordered list of the determined amounts of change; and determining, by the one or more processors, a respective offset within the texture for each element of the ordered list;

wherein modifying the texture includes using the ordered list and the determined offsets.

3. The method of claim 2, wherein modifying the texture includes modifying one of the several whole instances of the stipple pattern at the identified vertex of the polyline at which the maximum amount of change in direction of the polyline occurs.

4. The method of claim 1, wherein modifying the texture includes adjusting lengths of at least several of the whole instances of the stipple pattern to eliminate the remainder texels.

5. The method of claim 4, wherein the stipple pattern specifies a sequence of "on" values and a sequence of "off" values, and wherein adjusting the length of an instance of the stipple pattern includes extending or reducing one of the sequences.

6. The method of claim 5, wherein extending or reducing one of the sequences includes:

modifying the sequence of "on" values if the sequence of "on" values is longer than the sequence of "off" values, or modifying the sequence of "off" values if the sequence of "off" values is longer than the sequence of "on" values.

7. The method of claim 5, wherein modifying the texture includes applying a constraint that preserve a ratio of "on" values to "off" values.

8. The method of claim 4, wherein modifying the texture further includes adjusting lengths of each of the several whole instances to evenly divide the texture between the several whole instances.

9. The method of claim 1, further comprising providing the plurality of vertices of the polyline and the texture to a graphics processor configured to repeatedly apply instances of only textures of POT lengths to geometric shapes.

10. A computing device comprising:

a communication interface;

graphics processor configured to support textures only of certain lengths for repeated application to geometry; and processing hardware coupled to the communication interface and the graphics processor, the processing hardware configured to:

receive, via the communication interface (i) an indication of a polyline having a plurality of vertices, and (ii) a stipple pattern of a first length to be repeatedly applied along the polyline, generate a texture of a second length supported by the graphics processor made up of several whole instances of the stipple pattern and a portion of another instance of the stipple pattern defining remainder texels, identify a vertex from the plurality of vertices of the polyline at which a maximum amount of change in direction occurs; and modify the texture so that visual pattern discontinuity aligns with the identified vertex of the polyline at which the maximum amount of change in direction of the polyline occurs, when the graphics processor configured repeatedly applies the texture to the polyline.

11. The computing device of claim 10, wherein:

the graphics processor is configured to support textures only of power-of-two (POT) lengths, the first length is a not-a-power-of-two (NPOT) length, and the second length is a POT length.

12. The computing device of claim 10, wherein the processing hardware is further configured to:

determine respective amounts of change in direction at the plurality of vertices, generate an ordered list of the determined amounts of change, and determine a respective offset within the texture for each element of the ordered list;

wherein to modify the texture, the processing hardware is configured to use the ordered list and the determined offsets.

13. The computing device of claim 12, wherein to modify the texture, the processing hardware is configured to modify one of the several whole instances of the stipple pattern at the identified vertex of the polyline at which the maximum amount of change in direction of the polyline occurs.

14. The computing device of claim 10, wherein to modify the texture, the processing hardware is configured to adjust lengths of at least several of the whole instances of the stipple pattern to eliminate the remainder texels.

15. The computing device of claim 14, wherein the stipple pattern specifies a sequence of "on" values and a sequence of "off" values, and wherein to adjust the length of an instance of the stipple pattern, the processing hardware is configured to extend or reduce one of the sequences.

16. A method for reducing visual discontinuity when rendering stipple patterns, the method comprising:

receiving, by one or more processors, (i) an indication of a polyline having a plurality of vertices, and (ii) a stipple pattern of a first length to be repeatedly rendered along the polyline;

generating, by the one or more processors, a texture for applying to the polyline using graphics processor, wherein the texture is made up of several whole instances of the stipple pattern and a portion of another instance of the stipple pattern defining remainder texels, and wherein the texture has a second length that is not evenly divisible by the first length;

identifying, by the one or more processors, one of the plurality of vertices at which a maximum amount of change in direction of the polyline occurs; and modifying, by the one or more processors, the texture so that visual pattern discontinuity aligns with the identified vertex.

17. The method of claim 16, wherein:

the graphics processor is configured to support textures only of power-of-two (POT) lengths, the first length is a not-a-power-of-two (NPOT) length, and the second length is a POT length.

18. The method of claim 17, further comprising providing the plurality of vertices of the polyline and the texture to a graphics processor configured to repeatedly apply instances of only textures of POT lengths to geometric shapes.

19. The method of claim 16, wherein modifying the texture includes adjusting lengths of at least several of the whole instances of the stipple pattern to eliminate the remainder texels.

20. The method of claim 19, wherein the stipple pattern specifies a sequence of "on" values and a sequence of "off" values, and wherein adjusting the length of an instance of the stipple pattern includes extending or reducing one of the sequences.

\* \* \* \* \*